US009934245B2

(12) United States Patent
Lin et al.

(10) Patent No.: US 9,934,245 B2
(45) Date of Patent: Apr. 3, 2018

(54) METHOD FOR SYNCHRONIZING FILES AND ELECTRONIC DEVICE USING THE SAME

(71) Applicants:Beijing Lenovo Software Ltd., Haidian District, Beijing (CN); Lenovo (Beijing) Co., Ltd., Haidian District, Beijing (CN)

(72) Inventors: Songtao Lin, Beijing (CN); Ziwang Shi, Beijing (CN); Ning Deng, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 227 days.

(21) Appl. No.: 14/101,924

(22) Filed: Dec. 10, 2013

(65) Prior Publication Data

US 2014/0164448 A1    Jun. 12, 2014

(30) Foreign Application Priority Data

Dec. 10, 2012    (CN) .......................... 2012 1 0530184

(51) Int. Cl.
*G06F 7/00*          (2006.01)
*G06F 17/30*         (2006.01)

(52) U.S. Cl.
CPC .. *G06F 17/30179* (2013.01); *G06F 17/30203* (2013.01)

(58) Field of Classification Search
CPC ......... G06F 17/30575; G06F 17/30179; G06F 17/30203
See application file for complete search history.

(56) References Cited

U.S. PATENT DOCUMENTS 5,239,646 A * 8/1993 Kimura ................. G06F 3/0601
                                                      365/226
5,381,419 A * 1/1995 Zorian ............. G01R 31/31839
                                                      714/718

(Continued)

FOREIGN PATENT DOCUMENTS

CN         101567858       10/2009
CN         102681993       9/2012

OTHER PUBLICATIONS

First Office Action dated Sep. 12, 2016 out of Chinese priority Application No. 201210530184.3 (20 pages including English translation).

(Continued)

*Primary Examiner* — Daniel Kuddus
(74) *Attorney, Agent, or Firm* — Brinks Gilson & Lione; G. Peter Nichols

(57) ABSTRACT

A method for synchronizing files and an electronic device using the same are described. The method includes receiving a first instruction; executing the application installed on the electronic device according to the first instruction, a first file among a plurality of files for the application converts into a second state from the first state during a process for executing the application; writing the first file with the second state into a network storage by a first file system, in order to enable the application installed on another electronic device to be executed based on the first file with the second state in the network storage. An application progress may be shared and synchronized conveniently without a user's interaction or participation by writing the first file with the converted state into the network storage.

14 Claims, 5 Drawing Sheets

(56) References Cited

U.S. PATENT DOCUMENTS

| | | | | |
|---|---|---|---|---|
| 5,509,463 | A * | 4/1996 | Callaway, Sr. | F24J 3/00 165/169 |
| 5,539,891 | A * | 7/1996 | Childers | G06F 15/8015 348/262 |
| 5,613,109 | A * | 3/1997 | Yamauchi | G06F 17/30017 |
| 5,909,463 | A * | 6/1999 | Johnson | H04L 5/143 370/276 |
| 5,960,155 | A * | 9/1999 | Fukuoka | H04N 1/2112 386/224 |
| 6,032,268 | A * | 2/2000 | Swoboda | G06F 15/786 712/E9.016 |
| 6,212,331 | B1 * | 4/2001 | Fukuoka | H04N 1/2112 386/224 |
| 6,243,755 | B1 * | 6/2001 | Takagi | H04L 29/06 709/201 |
| 6,522,985 | B1 * | 2/2003 | Swoboda | G06F 8/41 702/108 |
| 7,015,068 | B2 * | 3/2006 | Subramanian | H01L 23/544 257/E23.179 |
| 7,162,662 | B1 * | 1/2007 | Svarcas | G06F 11/2074 707/E17.005 |
| 7,483,923 | B2 * | 1/2009 | Novik | G06F 17/30174 |
| 7,512,638 | B2 * | 3/2009 | Jhaveri | G06F 17/30206 |
| 8,758,898 | B2 * | 6/2014 | Friedman | B32B 17/10036 156/285 |
| 8,886,597 | B2 * | 11/2014 | Hahn | G06F 17/30218 707/613 |
| 9,075,954 | B2 * | 7/2015 | Kirigin | G06F 21/00 |
| 9,460,103 | B2 | 10/2016 | Wang | |
| 2003/0026150 | A1 * | 2/2003 | Rimondi | G06F 17/30569 |
| 2003/0224552 | A1 * | 12/2003 | Subramanian | H01L 23/544 438/106 |
| 2005/0256907 | A1 * | 11/2005 | Novik | G06F 17/30176 |
| 2006/0173932 | A1 * | 8/2006 | Cortright | G06F 17/30569 |
| 2007/0044098 | A1 * | 2/2007 | Ishimura | G06F 9/44 718/100 |
| 2008/0178256 | A1 * | 7/2008 | Perrone | G06F 9/468 726/1 |
| 2008/0294700 | A1 * | 11/2008 | Sugimoto | G06F 17/30174 |
| 2011/0099145 | A1 * | 4/2011 | Hahn | G06F 17/30218 707/613 |
| 2013/0063995 | A1 * | 3/2013 | Norrga | H02M 1/32 363/125 |
| 2013/0339296 | A1 | 12/2013 | Wang | |

OTHER PUBLICATIONS

Office Action, and English language translation thereof, in corresponding Chinese Application No. 20120530184.3, dated Feb. 10, 2017, 20 pages.

Third Office Action dated Jul. 19, 2017 (22 pages including English translation) in corresponding Chinese priority Application No. 201210530184.3.

* cited by examiner

METHOD FOR SYNCHRONIZING FILES AND ELECTRONIC DEVICE USING THE SAME

BACKGROUND

This application claims priority to Chinese patent application No. 201210530184.3 filed on Dec. 10, 2012, the entire contents of which are incorporated herein by reference.

The present invention relates to a field of electronic technique, and in particularly, to a method for synchronizing files and an electronic device using the same.

With rapid developments of a mobile internet and electronic devices like terminals, a user usually owns several electronic devices at a same time. For example, the user may have several portable electronic devices such as a mobile communication terminal, a tablet computer and a notebook computer and the like. Further, the user generally uses a desktop computer at his/her office for he/she works, and may uses a portable computer when he/she is out.

The user may install applications he/she prefers or needs on the respective electronic devices, in order to use different electronic devices in different environments. As an example, the user may install a same game application (for example, Angry Birds) on the mobile communication terminal and the tablet computer, and install a same work application on the portable computer and the desktop computer located his/her office. Therefore the user may execute the same game application or the same work application on the different electronic devices without being limited to a specified electronic device.

Many games or applications save their progresses in a local storage of the electronic device currently. As an example, when the user plays the game "Angry Birds" on the mobile communication terminal, he/she must storm strategic passes one by one in order to enter and pass following levels, wherein data related to the game progress is stored in the local storage of the electronic device. However, the game progress fails to be shared and synchronized among a plurality of devices because there is no effective data sharing mechanism among the electronic devices. As a result, the user has to storm strategic passes one by one, which have been passed on his/her mobile communication terminal, on the tablet computer again to continue his/her desired game progress, which may enormously decrease a user experience as switching among the several electronic devices. The work application among the different electronic devices also has the same problem.

Therefore, there is needed a solution for synchronizing the application progress without user's interactions/participancy, which may perform the synchronization for the application progress among the different electronic devices conveniently.

SUMMARY

Embodiments of the present disclosure provide a method for synchronizing files and an electronic device using the same, which may share and synchronize an application progress conveniently without user's interactions/participancy, and thus a usage experience for the user may be enhanced.

In an aspect according to the embodiments of the present disclosure, there is provided a method for synchronizing files applied to an electronic device, on which an application is installed, a plurality of files for the application are stored in a local storage in the electronic device, the plurality of files comprise a first file with a first state, and the electronic device is communicably coupled with a network storage, the method comprises: receiving a first instruction, executing the application according to the first instruction, the first file converts into a second state from the first state before the application is executed during a process for executing the application; writing, after the first file converts into the second state from the first state, the first file with the second state into the network storage by a first file system, in order to enable the application installed on another electronic device to be executed based on the first file with the second state in the network storage.

In the method for synchronizing files, the first file with the second state may be stored into the local storage by a second file system, after the first file converts into the second state from the first state.

In the method for synchronizing files, the writing the first file with the second state into the network storage by a first file system comprises: selecting the first file from the plurality of files; and writing the first file with the second state into the network storage.

In the method for synchronizing files, the writing the first file with the second state into the network storage by a first file system may comprise: determining whether a communication environment of the electronic device satisfies a predetermined condition; and writing the first file with the second state into the network storage when the communication environment of the electronic device satisfies the predetermined condition.

In the method for synchronizing files, the writing the first file with the second state into the network storage by a first file system may comprise: redirecting a save path of the first file by the first file system; and writing the first file with the second state into the network storage based on the redirected save path.

In the method for synchronizing files, a downloading instruction is issued when a user previously writing the first file into the network storage logs in another electronic device; and the first file previously stored in the network storage is downloaded based on the downloading instruction.

In the method for synchronizing files, a downloading instruction is issued when the application is launched; and the first file previously stored in the network storage is downloaded based on the downloading instruction.

In another aspect according to the embodiments of the present disclosure, there is provided a method for synchronizing files applied to an electronic device, on which an application is installed, a plurality of files for the application are stored in a local storage in the electronic device, the plurality of files comprise a first file with a first state, and the electronic device is communicably coupled with a network storage, the method comprises: receiving a first instruction, executing the application according to the first instruction, the first file converts into a second state from the first state before the application is executed during a process for executing the application; writing, after the first file converts into the second state from the first state, the first file with the second state into the local storage; writing, after the first file converts into the second state from the first state, the first file with the second state into the network storage, in order to enable the application installed on another electronic device to be executed based on the first file with the second state in the network storage.

In the method for synchronizing files, the writing the first file with the second state into the network storage comprises:

determining whether a communication environment of the electronic device satisfies a predetermined condition; and writing the first file with the second state into the network storage when the communication environment of the electronic device satisfies the predetermined condition.

In a still aspect according to the embodiments of the present disclosure, there is provided an electronic device on which an application is installed and with which a network storage is communicably coupled, comprising: a storage unit for storing a plurality of files related to the application, the plurality of files comprise a first file with a first state; an application execution unit for receiving a first instruction, executing the application according to the first instruction, the execution of the application causes the first file to convert into a second state from the first state before the application is executed; a first file processing unit for writing, after the first file converts into the second state from the first state, the first file with the second state into the network storage by a first file system, in order to enable the application installed on another electronic device to be executed based on the first file with the second state in the network storage.

In a further aspect according to the embodiments of the present disclosure, there is provided an electronic device on which an application is installed and with which a network storage is communicably coupled, comprising: a storage unit for storing a plurality of files related to the application, the plurality of files comprise a first file with a first state; an application execution unit for receiving a first instruction, executing the application according to the first instruction, the execution of the application causes the first file to convert into a second state from the first state before the application is executed; a first file processing unit for writing, after the first file converts into the second state from the first state, the first file with the second state into the network storage, in order to enable the application installed on another electronic device to be executed based on the first file with the second state in the network storage; and a second file processing unit for writing, after the first file converts into the second state from the first state, the first file with the second state into the storage unit.

In a further aspect according to the embodiments of the present disclosure, there is provided an electronic device with which a network storage is communicably coupled, comprising: a storage for storing program codes; and a processor for executing the program codes to implementing the method mentioned above.

In the solutions of the method for synchronizing files and the electronic device using the same, an application progress may be shared and synchronized conveniently without user's interactions/participancy by writing the first file with the converted state into the network storage, thus a usage experience for the user may be enhanced.

BRIEF DESCRIPTION OF THE DRAWINGS

In order to explain solutions in embodiments of the present disclosure or the prior art more clearly, drawings required as describing the embodiments of the present disclosure or the prior art will be introduced briefly below. Obviously, the drawings described below are only some embodiments of the present disclosure, but those ordinary skilled in the art may obtain other drawings according to these drawings without any inventive labors.

DETAILED DESCRIPTION

Embodiments of the present disclosure will be described clearly and completely hereafter in connection with drawings of the embodiments of the present disclosure, but obviously the described embodiments are only some, but not all of the embodiments of the present disclosure.

Figure 1:
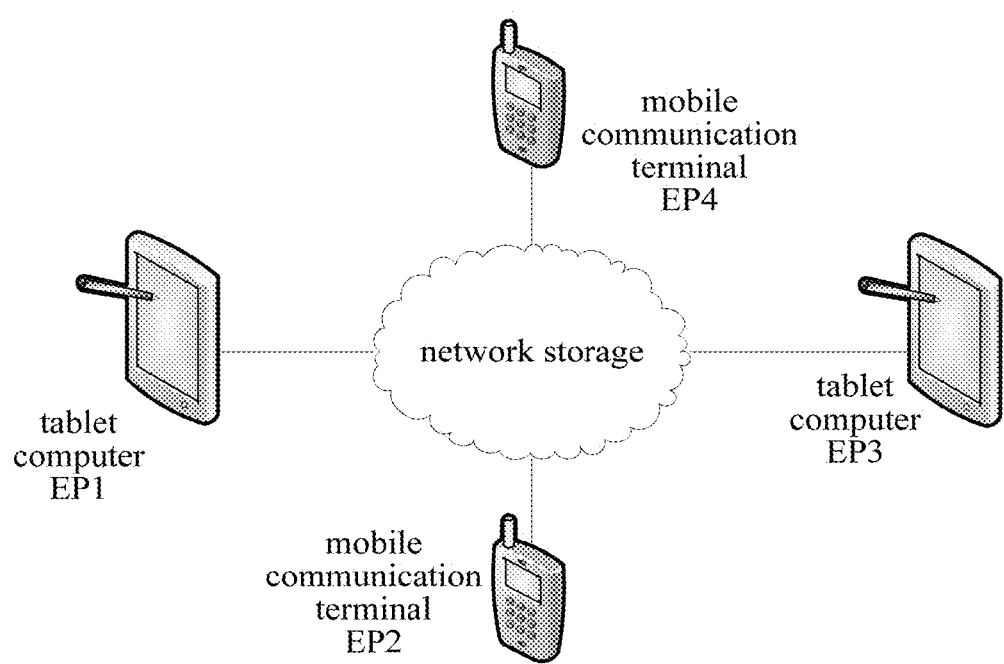
FIG. 1 is an exemplary view illustrating a system to which an embodiment of the present disclosure is applied.

FIG. 1 is an exemplary view illustrating a system to which an embodiment of the present disclosure is applied. In FIG. 1, there are four electronic devices, and each of the electronic devices is communicably coupled with a network storage so as to write/read data into/from the network storage. The four electronic devices include two tablet computers EP1 and EP3, and two mobile communication terminals EP2 and EP4, and the electronic device may be any other electronic device, for example, a notebook computer, a mobile apparatus on vehicle, etc., other than the tablet computer and the mobile communication terminal. The network storage may be any storage apparatus capable of being communicably coupled with the electronic device in a communication network, for example, may be a cloud storage server.

Detailed implementation will be described as follows. An application is installed on the tablet computer EP1 and a plurality of files for the application are stored in a local storage in the tablet computer EP1, a progress file among the plurality of files indicates an execution progress of the application; the tablet computer EP1 may store on the network storage the progress file for indicating the execution progress of the application when a user executes the application on the tablet computer EP1. This process is applicable to other electronic devices in FIG. 1. Further, any one of the four electronic devices in FIG. 1 may download the progress file from the network storage as needed, in order to obtain the execution progress of the application, so that a progress synchronization may be realized across the electronic devices.

Figure 2:
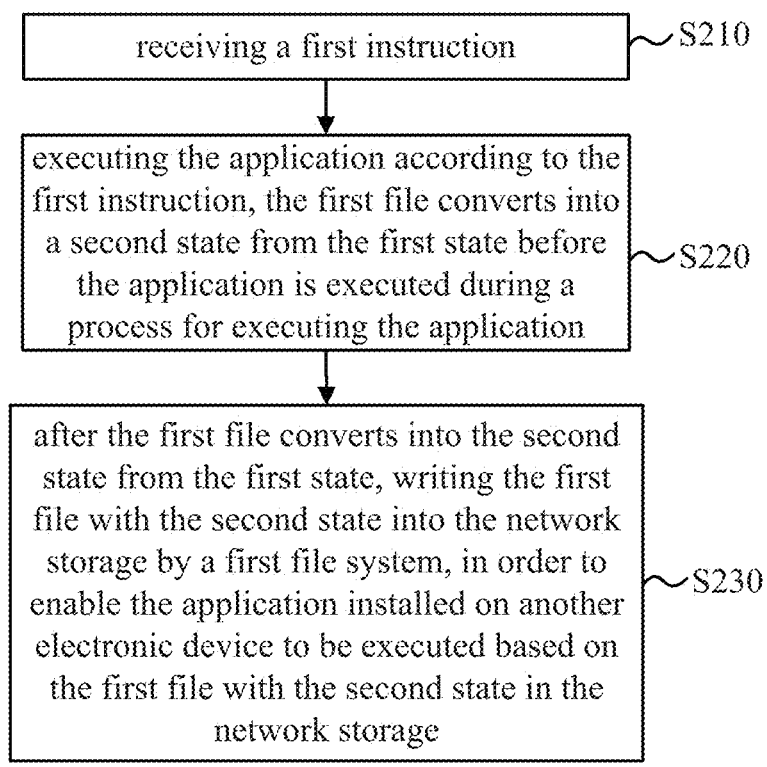
FIG. 2 is an exemplary flowchart illustrating a method for synchronizing files according to an embodiment of the present disclosure.

FIG. 2 is a flowchart illustrating a method 200 for synchronizing files according to an embodiment of the present disclosure. The method 200 for synchronizing files may be applied to any one of the electronic devices shown in FIG. 1, wherein an application (for example, a game "Angry Birds") is installed on the electronic device, a plurality of files for the application are stored in the local storage in the electronic device, the plurality of files comprise a first file with a first state (for example, the progress file described above), and the electronic device is communicably coupled with a network storage. For different applications, the first file may be distinguished from the plurality of files by using different methods, for example, it may be configured to automatically mark the first file in a process of installing the application. Further, a number of the first files may be one or more.

The method 200 for synchronizing files may comprise: receiving a first instruction (S210); executing the application according to the first instruction, the first file converts into a second state from the first state before the application is executed during a process for executing the application (S220); writing, after the first file converts into the second state from the first state, the first file with the second state into the network storage by a first file system, in order to enable the application installed on another electronic device to be executed based on the first file with the second state in the network storage (S230).

In S210, the first instruction is received. The first instruction may be, for example, an instruction issued when a user launches the application in the electronic device, and the first instruction is used for denoting that the application is desired to be executed/operated.

In S220, the application is executed according to the first instruction, and the first file converts into the second state from the first state before the application is executed during the process for executing the application. After the execution of the application is started according to the first instruction, new data for recording an execution progress of the application may be generated during the process for executing the application, which may render that a state of the first file among the plurality of files for the game stored in the local storage changes, for example, the state may converts into a second state from a first state before the application is executed. The first file with the second state records the execution progress of the application. Based on the first file with the second state, the application may go on its execution on a basis of the progress corresponding to the second state without being executed absolutely from the beginning. The state may refer to state information, such as a size, a time, etc., of the first file.

The state of the first file may change during the process for executing the application; therefore the first file may be determined from the plurality of files in advance based on this change feature. As an example for determining the first file, the states of the respective files among the plurality of files related to the application may be monitored during the process for executing the application, and the file whose state changes during the process for executing the application may be determined as the first file. A number of the first files may be one or more. Further, the file whose state changes during the process for executing the application may be tested in a manner of, for example, replacing the file with the pre-converted state by the file with the converted state, in order to further select the files necessary for synchronizing the progress among the files whose states change.

In S230, after the first file converts into the second state from the first state, the first file with the second state is written into the network storage by the first file system, in order to enable the application installed on another electronic device to be executed based on the first file with the second state in the network storage.

In the prior art, the first file with the converted state is generally written into the local storage in the electronic device, such as the tablet computer EP1 shown in FIG. 1. Thus, the same user cannot obtain the previous execution progress when he/she logs in the application by the mobile communication terminal EP2, for example, such that the application cannot be executed on the mobile communication terminal EP2 based on the previous execution progress.

In the S230, the first file with the second state is written into the network storage by the first file system, then the user may download the first file with the second state or acquire the execution progress of the application from the network storage when he/she executes the application on the mobile communication terminal EP2, so that the application may be executed based on the first file with the second state in the network storage. It can be seen that the application progress (the first file) may be shared or backed up in an automatic manner, thus the application progress may be shared and synchronized conveniently without user's interactions/participancy, which may enhance a usage experience for the user. Further, a space overhead for storing in the local storage of the electronic device may be saved because the first file for indicating the progress of the application is stored in the network storage.

The first file system may be a file system in user space (Fuse), for example. After the first file converts into the second state from the first state, the first file system selects the first file from the plurality of files at first, and then writes the first file with the second state into the network storage. As an example, in a case that the first file is stored in the local storage as described above, a save path of the first file may be redirected by the first file system; and the first file with the second state may be written into the network storage based on the redirected save path. Further, before the first file with the second state is written into the network storage, it may determine whether a communication environment of the electronic device satisfies a predetermined condition, and the first file with the second state is written into the network storage when the communication environment of the electronic device satisfies the predetermined condition.

Further, after the first file converts into the second state from the first state, the first file with the second state may be stored in the local storage by a second file system, for example, a File Allocation Table (FAT) file system. In a case that whether the communication environment of the electronic device satisfies the predetermined condition is further determined, the first file with the second state may be stored in the local storage if the communication environment of the electronic device does not satisfy the predetermined condition, in order to avoid a case in which the first file is difficult to be stored due to a poor communication environment. Thus, the user may execute the application based on the previous progress independent of a communication network and the network storage if the user executes the application on the same electronic device; and the user may also execute the application based on the previous progress if the user executes the application on another electronic device.

After the first file with the second state is written into the network storage by the first file system, a downloading instruction is issued when the user previously writing the first file into the network storage logs in another electronic device, and the first file previously stored in the network storage is downloaded based on the downloading instruction. When the user logs in another electronic device, it may determine whether the log-in is performed by the use previously writing the first file into the network storage based on a user name. Further, a downloading instruction may also be issued when the user launches the application on the electronic device at which the first file is uploaded, and the first file previously stored in the network storage may be downloaded based on the downloading instruction. The downloading instruction is generally converted into an instruction in an application layer of the electronic device so as to implement the download.

In the method 200 for synchronizing files according to the embodiment of the present disclosure, the application progress may be shared and synchronized conveniently without user's interactions/participancy by writing the first file with the converted state into the network storage, and thus a usage experience for the user may be enhanced.

Figure 3:
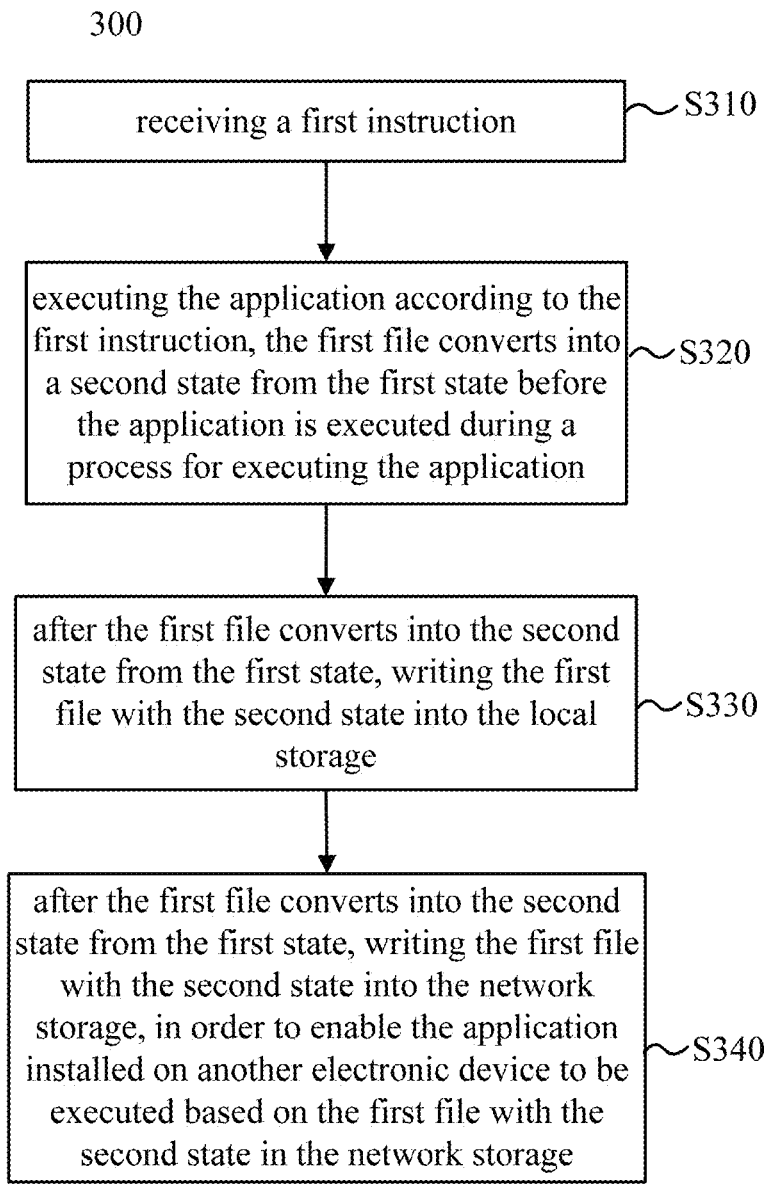
FIG. 3 is an exemplary flowchart illustrating a method for synchronizing files according to another embodiment of the present disclosure.

FIG. 3 is a flowchart illustrating a method 300 for synchronizing files according to another embodiment of the present disclosure. The method 300 for synchronizing files is applied to the electronic device shown in FIG. 1, the electronic device, on which an application is installed, is communicably coupled with a network storage, a plurality of files for the application are stored in a local storage in the electronic device, the plurality of files comprise a first file with a first state.

The method 300 for synchronizing files comprises: receiving a first instruction (S310); executing the application according to the first instruction, the first file converts into a second state from the first state before the application is executed during a process for executing the application (S320); writing, after the first file converts into the second state from the first state, the first file with the second state into the local storage (S330); and writing, after the first file converts into the second state from the first state, the first file with the second state into the network storage, in order to enable the application installed on another electronic device to be executed based on the first file with the second state in the network storage (S340).

The S310 and S320 are same as the S210 and S220 in FIG. 2 described above, so their descriptions may refer to those for the S210 and S220 in FIG. 2.

In S330, after the first file converts into the second state from the first state, the first file with the second state is written into the local storage. The first file with the converted state may be stored in the local storage by various techniques which have existed or will be developed in future, when the state of the first file is found to be changed and the first file with the converted state is needed to be stored during the process for executing the application. As an example, when the first file with the converted state is needed to be stored, a system call is performed to launch a Virtual File System (VFS), wherein the VFS parses types of the file systems, for example, a File Allocation Table (FAT) file system, a New Technology File System (NTFS) and the like, installed in the electronic device, and stores the first file with the converted state in the local storage by the FAT or NTFS file system.

In S340, the first file with the converted state is written into the network storage, in order to enable the application installed on another electronic device to be executed based on the first file with the second state in the network storage. As described above, the system call is performed to launch the Virtual File System (VFS) when the first file with the converted state is needed to be stored. The VFS parses the types of the file systems installed in the electronic device, and instructs a file system in user space (Fuse) to store the first file with the converted state in the network storage if it finds that the Fuse exists in the installed file systems. The Fuse file system hands over an implementation of a write operation to its Daemon process, so that the writing of the first file with the converted state into the network storage is implemented. Please note that, writing the first file into the network storage by the Fuse file system is only illustrative, and obviously other techniques or other file system may be utilized to perform the writing in practice.

In the S340, it may further determined whether the communication environment of the electronic device satisfies a predetermined condition at first, and the first file with the second state is written into the network storage only if the communication environment of the electronic device satisfies the predetermined condition.

In the method 300 for synchronizing files according to the embodiments of the present disclosure, the user not only may execute the application on the same electronic device independent of the communication network, but also may execute the application on another electronic device based on the previous progress, because the first file with the converted state is written into both the local storage and the network storage, so that the application progress may be shared and synchronized conveniently without user's interactions/participancy, and thus a usage experience for the user may be enhanced.

Figure 4:
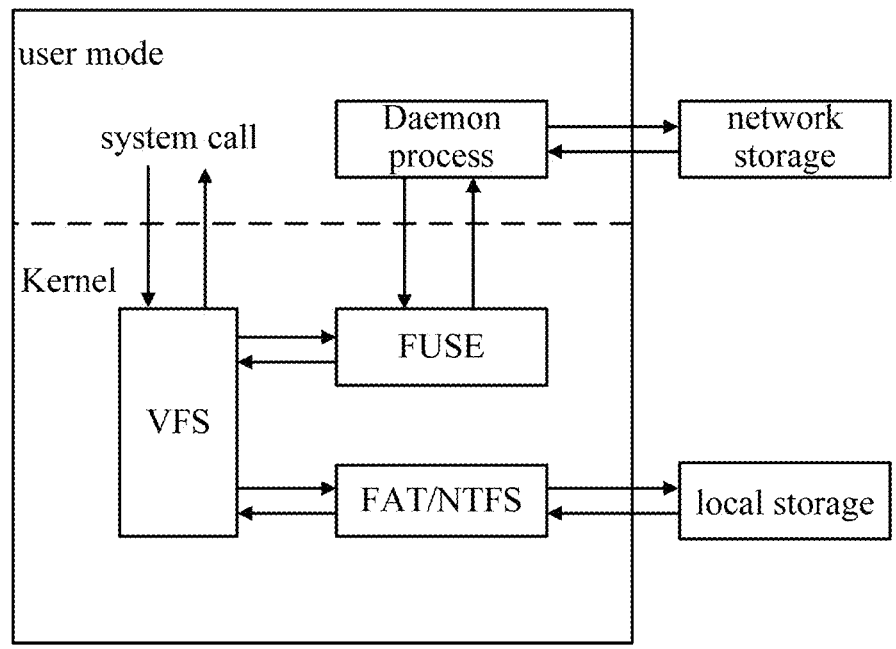
FIG. 4 illustrates an exemplary implementation of read and write operations according to the embodiment of the present disclosure.

In order to explain the embodiments of the present disclosure more fully, a write operation for the first file with the converted state will be described below in connection with FIG. 4. FIG. 4 illustrates an implementation example of read and write operations according to the embodiment of the present disclosure.

As illustrated in FIG. 4, the write operation for the first file with the converted state is performed in both a user mode and a kernel mode of an Operation System of the electronic device. When the first file with the converted state is needed to be stored after the S210 and S220 in FIG. 2 (or the S310 and S320 in FIG. 3), a system call is performed in the user mode (for example, a Put command is called) so as to launch a Virtual File System (VFS) in the kernel mode, and the VFS parses types (for example, a FAT file system, a NTFS file system, a Fuse file system, etc.) of the file systems installed in the electronic device.

If the first file with the converted state is only written into the network storage without being written into the local storage (the operation in S230), the VFS may instruct the Fuse file system to store the first file with the converted state in the network storage after the VFS finds the Fuse file system by parsing, then the Fuse file system may hand over the write operation to its Daemon process to implement. If the first file with the pre-converted state was written into the local storage, a save link of the first file is redirected to the network storage by the Daemon process; if the save link of the first file with the pre-converted state has directed to the network storage, the Daemon process may perform the write operation directly. If the first file with the converted state is written into both the network storage and the local storage (the operation in S330), the VFS may parse to find the Fuse file system and the FAT or NTFS file system, and then instruct FAT/NTFS file system to store the first file with the converted state in the local storage and instruct the Fuse file system to store the first file with the converted state in the network storage, then the Fuse file system may hand over the write operation to its Daemon process to implement.

In a case that the first file with the converted state is stored in the network storage, if the first file is required to be read form the network storage as the user logs in an electronic device, the system call is performed (for example, a Get command is called) by operating the application, in order to launch the Virtual File System (VFS) in the kernel mode, and the VFS parses the types (for example, a FAT file system, a NTFS file system, a Fuse file system, etc.) of the file systems installed in the electronic device.

If the first file is needed to be downloaded from the network storage, the VFS may instruct the Fuse file system to read the first file with the converted state from the network storage after the VFS finds the Fuse file system by parsing, then the Fuse file system may hand over the read operation to its Daemon process to implement.

If the first file is needed to be downloaded from the local storage, the VFS may instruct the FAT file system or the NTFS file system to read the first file with the converted state from the local storage after the VFS finds the FAT/NTFS file system by parsing.

It may know from the above description in connection with FIG. 4, in the methods for synchronizing files according to the embodiments of the present disclosure described in connection with FIGS. 2 and 3, both of the read operation and the write operation are performed in the user mode if the Fuse file system is utilized, for example, the processes for calling the Put/Get commands, operating the Daemon process for executing the Fuse file system and the like. The existing codes in the kernel need not to be changed, that is to say, an application (for example, a game) manufacturer is not required to modify source codes. An entire synchronization process of the game is independent of the code implementation absolutely, and is also independent of a service provider adopted for the application synchronization, thus the application synchronization may be performed by adopting various storage services provided by many cloud storage providers conveniently. This synchronization process is performed automatically, so that the user will not be aware of the entire process, which may enhance the user experience.

Figure 5:
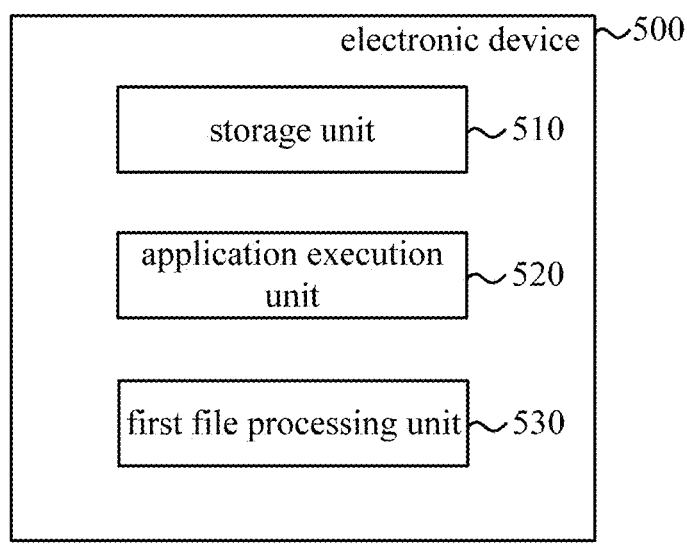
FIG. 5 is an exemplary block diagram illustrating an electronic device according to an embodiment of the present disclosure.

FIG. 5 is a block diagram illustrating an electronic device 500 according to an embodiment of the present disclosure. This electronic device is the electronic device connected with the network storage, as illustrated in FIG. 1, for example, the tablet computer, the mobile communication terminal, the notebook computer and the like. The type of the electronic device does not limit the present disclosure. Applications, such as a game, are installed on the electronic device.

The electronic device 500 comprises: a storage unit 510 for storing a plurality of files related to the application, the plurality of files comprise a first file with a first state; an application execution unit 520 for receiving a first instruction, executing the application according to the first instruction, the execution of the application causes the first file to convert into a second state from the first state before the application is executed; and a first file processing unit 530 for writing, after the first file converts into the second state from the first state, the first file with the second state into the network storage by a first file system, in order to enable the application installed on another electronic device to be executed based on the first file with the second state in the network storage.

The storage unit 510 stores the plurality of files related to the application, which are stored on the storage unit 510 when the electronic device installs the application. The plurality of files comprise the first file with the first state, and a number of the first files may be one or more. For different applications, the first file may be distinguished from the plurality of files by using different methods, for example, it may be configured to automatically mark the first file in a process of installing the application.

The application execution unit 520 receives the first instruction and executes the application according to the first instruction. The first instruction may be, for example, an instruction issued when a user launches the application in the electronic device, and the first instruction is used to denote that the application is desired to be executed/operated. The application execution unit 520 initiates the execution of the application according to the first instruction, and new data for recording an execution progress of the application may be generated during the process for executing the application, which may render that a state of the first file among the plurality of files for the game stored in the local storage changes, for example, the state may converts into a second state from a first state before the application is executed. The first file with the second state records the execution progress of the application. Based on the first file with the second state, the application may go on its execution on a basis of the progress corresponding to the second state without being executed absolutely from the beginning. The state may refer to state information, such as a size, a time, etc., of the first file.

The state of the first file may change during the process for executing the application, thus the first file may be determined from the plurality of files based on this change feature. Such determination may completed by an advanced test for the application execution. The first file may be stored directly in the respective embodiments of the present disclosure. As an example for determining the first file among the plurality of files, the states of the respective files among the plurality of files related to the application may be monitored during the process for executing the application, and the file whose state changes during the process for executing the application may be determined as the first file. Further, the file whose state changes during the process for executing the application may be tested in a manner of, for example, replacing the file with the pre-converted state by the file with the converted state, in order to further select the files necessary for synchronizing the progress among the files whose states change.

In the prior art, the first file with the converted state is generally written into the local storage in the electronic device (such as the tablet computer EP1 shown in FIG. 1). Thus, the same user cannot obtain the previous execution progress when he/she logs in the application by the mobile communication terminal EP2, for example, such that the applicant cannot be executed on the mobile communication terminal EP2 based on the previous execution progress.

The first file processing unit 530 writes the first file with the second state into the network storage by the first file system. Thus the user may download the first file with the second state or acquire the execution progress of the application from the network storage when he/she executes the application on the mobile communication terminal EP2, so that the application may be executed based on the first file with the second state in the network storage. It can be seen that the application progress (the first file) may be shared or backed up in an automatic manner, thus the application progress may be shared and synchronized conveniently without user's interactions/participancy, which may enhance a usage experience for the user. Further, a space overhead for storing in the local storage of the electronic device may be saved because the first file for indicating the progress of the application is stored in the network storage.

The first file system may be a Fuse file system, for example, or any other file system capable of writing the file into the network storage. The first file processing unit 530 may write the first file with the second state into the network storage by the first file system as follows: selects the first file from the plurality of files; and writes the first file with the second state into the network storage. Further, before the first file processing unit 530 writes the first file with the second state into the network storage, it may determine whether a communication environment of the electronic device satisfies a predetermined condition, and writes the first file with the second state into the network storage only when the communication environment of the electronic device satisfies the predetermined condition.

Further, the electronic device 500 may further comprise a second file processing unit. The second file processing unit is used for, after the first file converts into the second state from the first state, storing the first file with the second state in the storage unit by a second file system. The second file system may be, for example, a FAT file system, a NTFS file system or any other file system capable of storing locally. In a case that whether the communication environment of the electronic device satisfies the predetermined condition is further determined, the second file processing unit may store the first file with the second state in the local storage if the communication environment of the electronic device does not satisfy the predetermined condition, in order to avoid a case in which the first file is difficult to be stored due to a poor communication environment.

In a case that the first file is stored both in the local storage and the network storage, the user may execute the application based on the previous progress independent of a communication network and the network storage if the user executes the application on the same electronic device; and may also download the first file from the network storage and execute the application based on the previous progress if the user execute the application on another electronic device.

After the first file with the second state is written into the network storage by the first file system, the first file processing unit issues a downloading instruction by the first file system when the user previously writing the first file into the network storage logs in another electronic device, and downloads the first file previously stored in the network storage based on the downloading instruction. When the user logs in another electronic device, it may determine whether the log-in is performed by the user previously writing the first file into the network storage based on a user name. Further, the first file processing unit also may issue the downloading instruction by the first file system when the user launches the application on the electronic device at which the first file is uploaded, and downloads the first file previously stored in the network storage based on the downloading instruction. The downloading instruction is generally converted into an instruction in an application layer of the electronic device so as to implement the download.

Further, in a case that the first file is stored in the local storage previously, the first file processing unit 530 may, for example, redirect a save path of the first file by the first file system and writes the first file with the second state into the network storage based on the redirected save path.

In the electronic device 500 according to the embodiments of the present disclosure, the application progress may be shared and synchronized conveniently without user's interactions/participancy by writing the first file with the converted state into the network storage, and thus a usage experience for the user may be enhanced.

Figure 6:
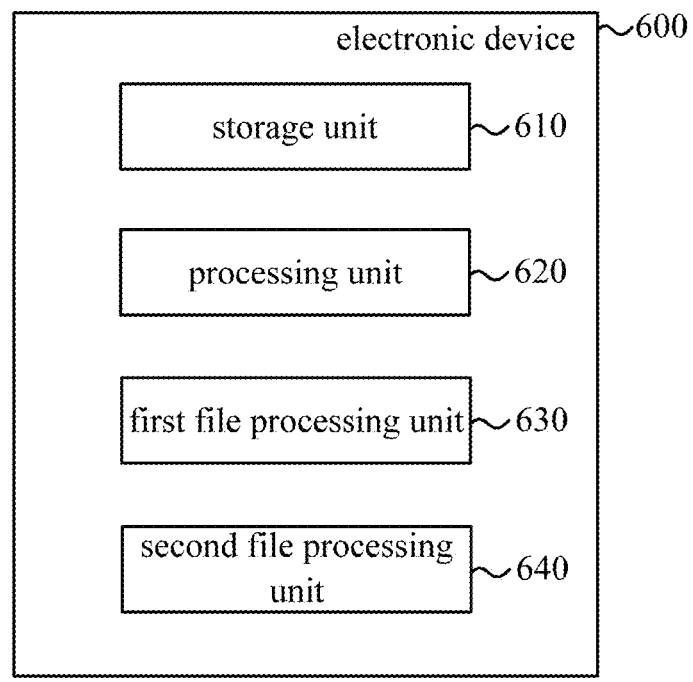
FIG. 6 is an exemplary block diagram illustrating an electronic device according to another embodiment of the present disclosure.

FIG. 6 is a block diagram illustrating an electronic device 600 according to another embodiment of the present disclosure. An application is installed on the electronic device 600, and the electronic device 600 is communicably coupled with a network storage.

The electronic device 600 comprises: a storage unit 610 for storing a plurality of files related to the application, the plurality of files comprise a first file with a first state; an application execution unit 620 for receiving a first instruction, executing the application according to the first instruction, the execution of the application causes the first file to convert into a second state from the first state before the application is executed; a first file processing unit 630 for writing, after the first file converts into the second state from the first state, the first file with the second state into the network storage, in order to enable the application installed on another electronic device to be executed based on the first file with the second state in the network storage; and a second file processing unit 640 for writing, after the first file converts into the second state from the first state, the first file with the second state into the storage unit.

The storage unit 610 and the application execution unit 620 are as same as the storage unit 510 and the application execution unit 520 in FIG. 5, respectively, so their detailed descriptions may refer to the corresponding descriptions made in connection with FIG. 5.

The first file processing unit 630 stores the first file with the second state into the network storage, in order to enable the application installed on another electronic device to be executed based on the first file with the second state in the network storage. As described above, the first file processing unit 630 may perform the system call to launch the Virtual File System (VFS). The VFS instructs the Fuse file system to store the first file with the converted state in the network storage. Furthermore, the first file processing unit 630 may store the first file with the converted state in the network storage by any other technique, and the detailed implementation does not limit the embodiments of the present disclosure.

The first file processing unit 630 may further determine whether the communication environment of the electronic device satisfies a predetermined condition at first, and write the first file with the second state into the network storage only if the communication environment of the electronic device satisfies the predetermined condition.

The second file processing unit 640 writes the first file with the second state into the local storage. As an example, the second file processing unit 640 may perform a system call to launch a Virtual File System (VFS), wherein the VFS parses types of the file systems (for example, a FAT file system or a NTFS file system) installed in the electronic device, and stores the first file with the converted state in the local storage by the file system obtained by parsing.

In the electronic device 600 according to the embodiments of the present disclosure, the user not only may execute the application on the same electronic device independent of the communication network, but also may execute the application on another electronic device based on the previous progress, because the first file with the converted state is written into both the local storage and the network storage, so that the application progress may be shared and synchronized conveniently without user's interactions/participancy, and thus a usage experience for the user may be enhanced.

Figure 7:
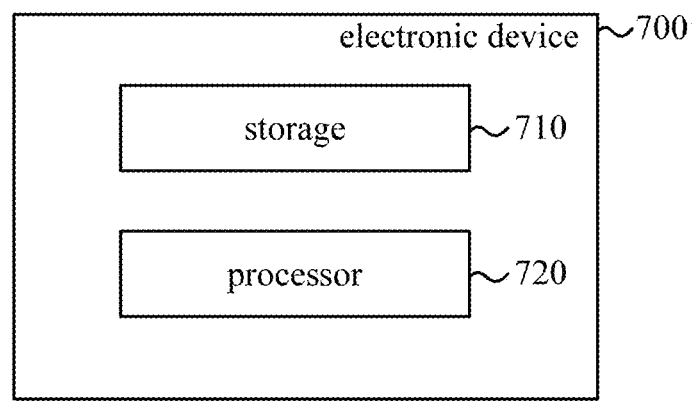
FIG. 7 is an exemplary block diagram illustrating an electronic device according to a further embodiment of the present disclosure.

FIG. 7 is a block diagram illustrating an electronic device 700 according to a further embodiment of the present disclosure. The electronic device 700 is communicably coupled with a network storage, and comprises: a storage 710 for storing program codes; and a processor 720 for executing the program codes to implementing the method for synchronizing files described in connection with FIGS. 2 and 3.

The storage 710 may comprise at least one of a Read-Only Memory and a Random Access Memory, and provide instructions and data to the processor 720. A part of the storage 710 may further comprise a Non-Volatile Random Access Memory.

The processor 720 may be a general purpose processor, a Digital Signal Processor (DSP), a Application Specific Integrated Circuit (ASIC), a Field-Programmable Gate Array (FPGA) or any other programmable logic device, discrete gates or transistor logic devices, discrete hardware components. The general purpose processor may be a microprocessor or any conventional processor, etc.

The steps of the methods disclosed in connection with the embodiments of the present disclosure may be embodied as being executed directly by the processor or executed by a combination of hardware and software modules in the processor. The software module may reside in a sophisticated storage medium in the art, such as the random access memory, a flash memory, a read-only memory, a programmable read-only memory or an electrical erasable programmable memory, a register, etc. The storage medium is located in the storage 710. The processor 720 reads information in the storage 710 and completes the steps of the above method combined with its hardware.

Those skilled in the art should realize that various units or steps described with reference to the embodiments of the present disclosure may be implemented in a form of electronic hardware, computer software or combination thereof. Whether one of functions is implemented in the form of hardware or in the form of software is dependent on a particular application to which the technical solution is applied and particular design constraints. For each specific application, different methods may be used by professionals to achieve the described functionality, but such implementation should not be construed as exceeding the scope of the present disclosure.

For the purpose of convenience and simplicity of the description, it is clear that those skilled in the art can easily understand the particular processes of the apparatus and units therein as described above with reference to the corresponding processes in the embodiments of the method described hereinbefore, and the detailed thereof is omitted.

Those skilled in the art can appreciate that the units and the steps of the algorithm in individual examples described in combination with the embodiments disclosed herein can be implemented in electronic hardware, or the combination of computer software and electronic hardware. Whether the functions are carried out in the form of hardware or in the form of software, it depends on the specific applications of the technical solution and constrains on the design thereof. Those skilled in the art can use different methods to implement the functions as described for each specific application, and such an implementation should not be considered as going beyond the scope of the present invention.

In the embodiments provided in the application, it should be understand that the apparatus and the method as disclosed can be implemented in other manners. For example, the above embodiments of the apparatus are only for illustration, e.g., the division of the unit only shows a function division in logic, but there are other forms of divisions in an actual realization; for example, a plurality of units or components can be combined or can be integrated into another device, or some features can be ignored or are not be carried out.

The units described as individual part may be or not be apart physically, the section listed as units may be or not be physical units. Part of or all of the units may be selected to realize the purpose of the present disclosure as necessary.

If the functions are implemented in the function units in software which is on sale or used as separate products, they can be stored in a computer readable storage medium. Based on the understanding, the solution of the present disclosure in essence or the part of the present disclosure contributing to the prior art or a part of the technical solution can be embodied in software products, and the computer software products are stored in a storage medium and comprises several instructions to cause a computing device (can be a personal computer, a server, or a network device or the like) to carry out the entire or partial steps of the methods of the individual embodiments of the present invention. The storage medium includes medium for storing program code, such as U disk, mobile hardware, read-only memory, random access memory, magnetic disk, or disk etc.

The above descriptions only illustrate the specific embodiments of the present disclosure, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by the claims.

The invention claimed is:

1. A method for synchronizing files applied to an electronic device, on which an application is installed, a plurality of files for the application are stored in a local storage in the electronic device, the plurality of files comprise a first file with a first state, and the electronic device is communicably coupled with a network storage, the method comprises:
  receiving a first instruction for executing of the application;
  executing the application according to the first instruction, wherein the first file is converted from the first state into a second state in response to the executing of the application, and the first file with the second state records execution progress of the application;
  writing into the network storage by a first file system after the first file is converted into the second state, wherein the first file with the second state in the network storage is provided for the application installed on another electronic device to be executed based on the first file with the second state;
  monitoring the states of the respective files among the plurality of files related to the application during the process for executing the application;
  testing the file whose state changes during the process for executing the application in a manner of replacing the file with the pre-converted state by the file with the converted state, and
  selecting the files necessary for synchronizing the progress among the files whose states change as the first file,
  wherein the writing the first file with the second state into the network storage by the first file system comprises determining whether a communication environment of the electronic device satisfies a predetermined condition; and writing the first file with the second state into the network storage when the communication environment of the electronic device satisfies the predetermined condition.

2. The method of claim 1, wherein the first file with the second state is stored into the local storage by a second file system, after the first file is converted into the second state from the first state.

3. The method of claim 2, wherein the writing the first file with the second state into the network storage by the first file system comprises redirecting a save path of the first file by the first file system; and writing the first file with the second state into the network storage based on the redirected save path.

4. The method of claim 1, wherein the writing the first file with the second state into the network storage by the first file system comprises selecting the first file from the plurality of files; and writing the first file with the second state into the network storage.

5. The method of claim 1, wherein the writing the first file with the second state into the network storage by the first file system comprises redirecting a save path of the first file by the first file system; and writing the first file with the second state into the network storage based on the redirected save path.

6. The method of claim 1, further comprising:
issuing a downloading instruction upon a user of the electronic device logging in another electronic device, wherein the user is a user corresponding to the step of writing the first file into the network storage; and
downloading the first file previously stored in the network storage based on the downloading instruction.

7. The method of claim 1, further comprising issuing a downloading instruction when the application is launched; and downloading the first file previously stored in the network storage based on the downloading instruction.

8. An electronic device on which an application and a first file system are installed and with which a network storage is communicably coupled, comprising:
a local storage configured to store a plurality of files related to the application, the plurality of files including a first file with a first state; and,
at least one processor configured to:
receive a first instruction for executing of the application;
execute the application according to the first instruction, wherein the first file is converted from the first state into a second state in response to the executing of the application, and the first file with the second state records execution progress of the application;
write the first file with the second state into the network storage by the first file system after the first file is converted into the second state from the first state, wherein the first file with the second state in the network storage is provided for the application installed on another electronic device to be executed based on the first file with the second state;
monitor the states of the respective files among the plurality of files related to the application during the process for executing the application;
test the file whose state changes during the process for executing the application in a manner of replacing the file with the pre-converted state by the file with the converted state; and
select the files necessary for synchronizing the progress among the files whose states change as the first file,
wherein the at least one processor is configured to determine whether a communication environment of the electronic device satisfies a predetermined condition; and write the first file with the second state into the network storage when the communication environment of the electronic device satisfies the predetermined condition.

9. The electronic device of claim 8 wherein, a second file system is installed on the electronic device, and the at least one processor is further configured to store the first file with the second state in the local storage by the second file system, after the first file is converted into the second state from the first state.

10. The electronic device of claim 9, wherein the at least one processor is configured to redirect a save path of the first file; and write the first file with the second state into the network storage based on the redirected save path.

11. The electronic device of claim 8, wherein the at least one processor is configured to select the first file from the plurality of files; and write the first file with the second state into the network storage.

12. The electronic device of claim 8, wherein the at least one processor is configured to redirect a save path of the first file; and write the first file with the second state into the network storage based on the redirected save path.

13. The electronic device of claim 8, wherein the at least one processor is further configured to issue a downloading instruction by the first file system upon a user of the electronic device logging in another electronic device, wherein the user is a user corresponding to the step of writing the first file into the network storage and download the first file previously stored in the network storage based on the downloading instruction.

14. The electronic device of claim 8, wherein at least one processor is further configured to issue a downloading instruction by the first file system when the application is launched, and download the first file previously stored in the network storage based on the downloading instruction.

\* \* \* \* \*